May 3, 1960   A. F. SPERRY   2,935,740
PRESSURE TRANSDUCER SYSTEM
Filed Nov. 4, 1954   2 Sheets-Sheet 1
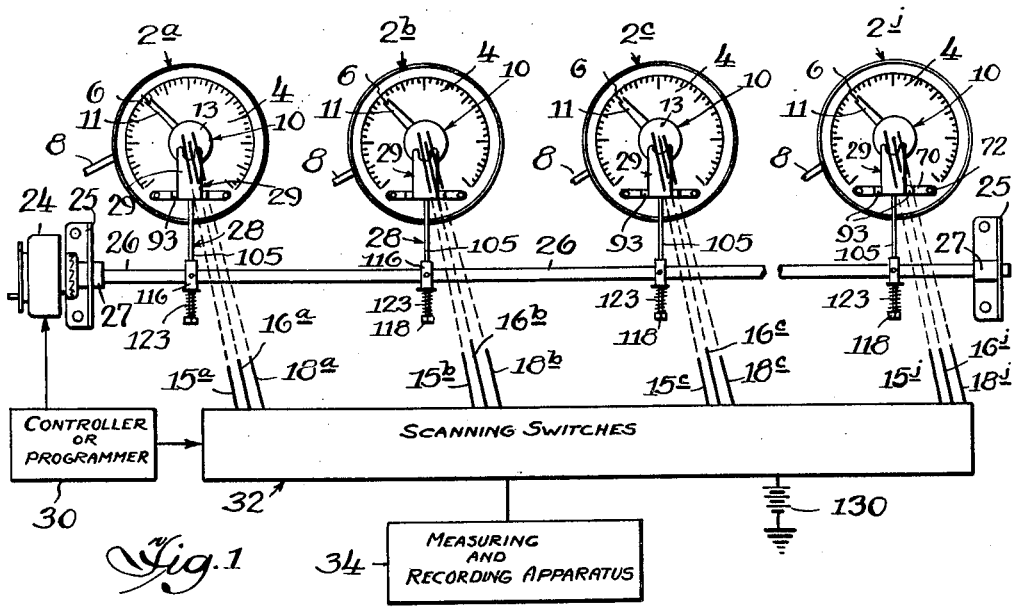
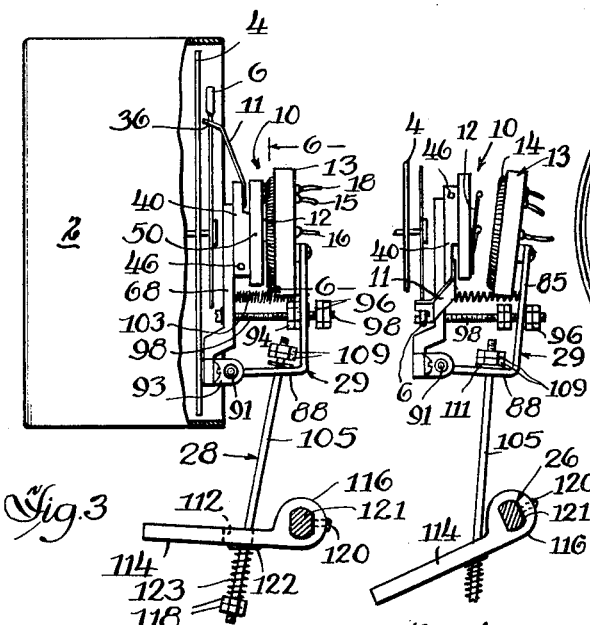
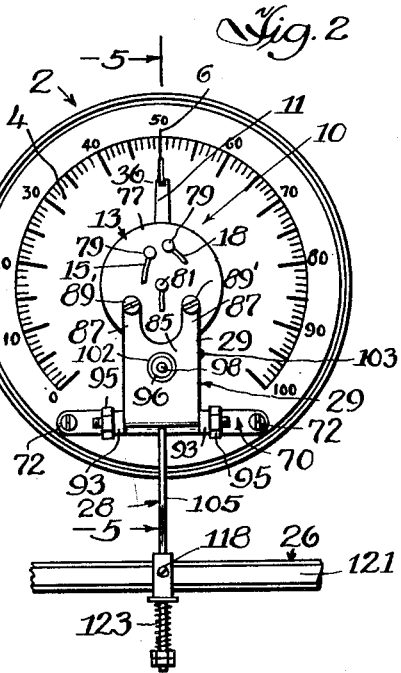
Inventor
Albert F. Sperry,
Russell E. Hall Atty.

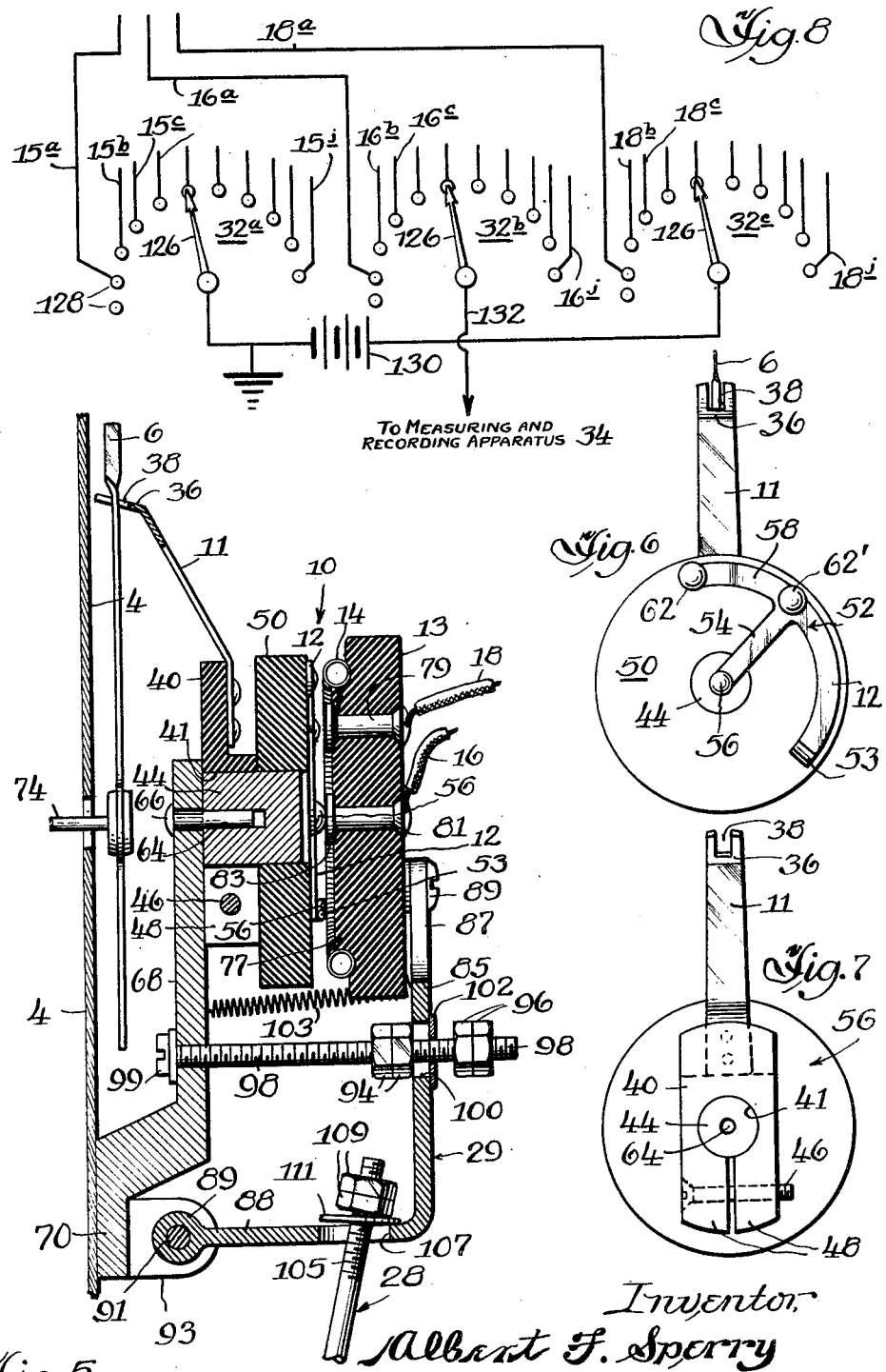

United States Patent Office 2,935,740
Patented May 3, 1960

2,935,740

PRESSURE TRANSDUCER SYSTEM

Albert F. Sperry, Chicago, Ill., assignor to Panellit, Inc., Skokie, Ill., a corporation of Illinois Application November 4, 1954, Serial No. 466,776

2 Claims. (Cl. 340—182)

The present invention relates to a telemetering system wherein the movement of a condition responsive element of a measuring instrument is converted to an electrical signal by a suitable transducing element which signal is transmitted to remotely located apparatus which records or indicates the value of the variable.

Where the magnitudes of a number of process variables are to be sequentially recorded, and the magnitudes of the variables fluctuate appreciably during the recording interval, a problem exists in obtaining a record of the values of these variables referred to a given instant of time. It is apparent that a fluctuation in a variable in the time it takes to connect the recording apparatus sequentially to the transducers associated with different measuring instruments, one of which measures the fluctuating variable, will be reflected in the recorded information so that the information will not represent the values of the variables at the same instant of time. This problem is particularly acute where a large number of process variables or test points are involved, where, for example, it may take a matter of minutes to scan the outputs of the various transducers.

Accordingly, one of the objects of the present invention is to provide a telemetering system wherein a recording device is sequentially connected to the outputs of a number of transducer elements associated with respective measuring instrument, and which includes suitable control means for simultaneously fixing the outputs of the various transducer elements so that a recording apparatus which is sequentially connected to the transducer outputs will nevertheless record the values of the variables occurring at the same instant of time. In effect, the present invention provides a means for memorizing the values of a large number of variables occurring at a particular instant.

In accordance with the invention, the movable condition-responsive elements of the measuring instruments are locked in position at the beginning of a recording interval so that the outputs of the various transducers connected thereto during the recording interval provide a measure of the values of the related variables at the same instant of time.

Another object of the present invention is to provide a relatively inexpensive arrangement for interconnecting the delicately mounted shaft of a measuring instrument with the movable element of an electrical transducing element which arrangement provides a negligible drag on the control shaft of the measuring instrument so that the sensitivity of the latter is not impaired.

The measuring instruments may be highly sensitive instruments, and if the shaft of such an instrument is to control the output of a transducer, the mechanical connection between the shaft and the transducer must be such that the latter applies an insignificant restraining torque or drag on the sensitive control shaft of the measuring instrument prior to the time the shaft is locked in position.

In the preferred form of the invention, the transducer element is a potentiometer having a wiper which is connected directly with the indicating pointer of a measuring instrument. The wiper of the potentiometer is mounted for rotation in a separate bearing which is coaxial of the axis of rotation of the control shaft of the measuring instrument so that the control shaft does not support the weight of the wiper. An arm mounted for rotation with the wiper is formed with a bifurcated end which snugly straddles the pointer of the measuring instrument so that any rotational movement of the pointer is transmitted to the wiper arm of the potentiometer, and axial movement of the bifurcated arm is not imparted to the pointer. The windings of the potentiometer are mounted for pivotal movement toward and away from the wiper arm, and the potentiometer winding is held in a position out of engagement with the wiper arm when a new measurement is desired. When it is desired to record the value of the variable indicated by the measuring instrument, the potentiometer is moved into engagement with the wiper arm, and the pressure of the potentiometer winding against the wiper arm is sufficiently great to effectively lock the control shaft of the measuring instrument in place. The potentiometer windings of all of the measuring instruments in the telemetering system are simultaneously brought into engagement with their associated wiper arms at the beginning of a recording interval so that the outputs of all of the potentiometers represent the values of the various variables at the same instant of time. Thus, mounting of the potentiometer windings for movement toward and away from the wiper arms performs a double function, namely, one of relieving the control shaft of each measuring instrument from the frictional drag between the potentiometer wiper arm and the potentiometer windings and providing the means for locking or fixing the control shafts of the various measuring instruments in place when recording of the variables is desired.

Other objects, features and advantages of the invention will become apparent upon making reference to the specification to follow, taken in conjunction with the drawings showing one form of the invention.

In the drawings:

Fig. 1 is a partially diagrammatic view of the telemetering system making up the present invention;

Fig. 2 is an enlarged front view of one of the measuring instruments and the associated transducer shown in Fig. 1;

Fig. 3 is a side view of the apparatus of Fig. 2 in one position of operation thereof;

Fig. 4 is a side view of the apparatus of Fig. 3 in another position of operation thereof;

Fig. 5 is an enlarged vertical section through the apparatus of Fig. 2, taken along section line 5—5 in Fig. 2;

Fig. 6 is a slightly enlarged front view of a portion of the transducer of Fig. 2, taken along section line 6—6 in Fig. 3;

Fig. 7 is a rear view of the portion of the transducer shown in Fig. 6; and

Fig. 8 is a schematic diagram of a portion of the scanning switch apparatus shown in block form in Fig. 1.

Reference should now be made to the drawings where like reference numerals indicate like elements throughout.

Referring particularly to Fig. 1, the form of telemetering system there illustrated includes a large number of measuring instruments mounted in horizontal alignment, four such instruments 2a, 2b, 2c and 2j being shown. These instruments may, for example, be Bourdon pressure gauges and each includes an index scale plate 4 across which a pointer 6 is movable. In the case where the measuring instruments are Bourdon pressure gauges, input air pressure lines 8 are provided which are connected, respectively, to different test points in a gas flow system of an industrial process. Mounted on the front face of each measuring instrument is a transducer assembly, generally indicated by the reference numeral 10. Each transducer assembly is connected mechanically to the pointer 6 of the associated measuring instrument by a rotatably mounted control arm 11 so that movement of the pointer 6 is coupled to the transducer assembly to vary an electrical signal in the transducer output.

In the preferred form of the invention, each transducer is a potentiometer, the detailed construction of which will be described hereinafter. Suffice it to say for the present, each potentiometer includes a wiper arm 12 (Fig. 4) rotatably mounted about an axis coaxial with the axis of rotation of the pointer 6 and a separate potentiometer element 14 in front of the wiper and mounted on an insulating disc 13 which is pivotally mounted about a horizontal axis for movement toward and away from the wiper so that the potentiometer winding 14 is movable into and out of contact with the wiper. The control arm 11 is connected between the wiper 12 and the pointer 6 so that rotation of the pointer rotates the wiper and varies the magnitude of the voltage on the wiper arm. Electrical connections to the opposite ends of the potentiometer windings are made through conductor pairs 15a—18a, 15b—18b, 15c—18c and 15j—18j, respectively. Connections to the wipers are made through the wires 16a, 16b, 16c and 16j, respectively.

The movement of each potentiometer windings 14 toward and away from its wipers 12 is controlled by a conventional rotary type relay 24 whose armature is connected to a shaft 26 extending beneath the measuring instruments and journalled in suitable bearings 27. A linkage 28 is coupled between each shaft 26 and a lever 29 operating the insulating disc 13. When the relay 24 is energized, the shaft 26 is turned to a position where each connected linkage 28 pivots the associated potentiometer winding forwardly out of contact with its wiper 12. When the relay is deenergized, the shaft 26 is turned back to a position where the linkages 28 simultaneously move the potentiometer windings rearwardly into tight frictional engagement with their associated wipers. In the latter position, the friction between each wiper and its potentiometer winding is sufficient to lock or hold the connected measuring instrument pointer 6 in place even though the pressure in the associated input line 8 subsequently varies. The outputs of all the potentiometers thus represent the values of a number of pressure variables occurring at the same instant of time, and these values are memorized until recording of the information is completed.

The operation of the relay 24 may be controlled by a suitable controller or programmer, indicated generally by the reference numeral 30. At the appropriate time, the programmer 30 feeds energizing voltage to the relay 24 to energize the same and move the connected shaft 26 into a position which unlocks or frees the pointer 6 so that the pointer may assume a new position, assuming that the pressure variable has changed in value. Then, just prior to the time when recording of the new values of the variables is desired, the energizing voltage fed to the relay 24 by the programmer is terminated which causes the potentiometer windings to move simultaneously into frictional locking engagement with their wipers. As above explained, the outputs of the transducers or potentiometers 10 then indicate the new values of the associated variables related to the same instant of time.

Means is provided to sequentially record the magnitudes of the variables as measured by the electrical outputs of the potentiometers. This latter means includes a series of scanning switches 32, shown in box form in Fig. 1, which scanning switches are connected to the electrical leads 15, 16 and 18 leading to the various potentiometers, as shown in Fig. 7. This circuit will be described later on. The scanning switches sequentially connect the leads 16a, 16b, 16c and 16j to a suitable measuring and recording apparatus 34. This measuring and recording apparatus 34 may, for example, be similar to that described in my co-pending application Serial No. 436,971, filed June 15, 1954, entitled, "Average Flow Indicating and Recording System." However, any suitable well-known measuring and recording system may be utilized. The operation of the scanning switches may be controlled by suitably timed pulses fed from the programmer 30.

Since apparatus providing programming functions such as the generation of suitably timed control pulses are old in the art, a disclosure of the details of the programmer 30 has been omitted to avoid unduly complicating the present disclosure.

Refer now to Figs. 2 through 6 which show the detailed construction of the potentiometers 10 and their connection with the Bourdon gauge pointers 6 and the relay operated shaft 26.

Each control arm 11 connecting a potentiometer wiper with a pointer 6 is a flexible strip of metal having a bent bifurcated portion 36 at one end which straddles the pointer 6. Sufficient clearance is provided between the end of the slot 38 which forms the bifurcation and the pointer 6 such that the arm 11 may be moved axially toward the pointer a small distance without transmitting a force to the pointer 6. The other end of the control arm 11 is secured to a split sleeve collar 40 made of insulating material. The split sleeve collar 40 has a circular hole 41 which receives a cylindrical metal bearing member 44. The collar is removably secured to the bearing 44 by means of a screw 46 threaded through aligned holes in the separated legs 48 of the split sleeve collar 40. The front end of the bearing 44 is press fitted within a hole formed in a circular insulating disc 50, the rear face of which engages the front face of the collar 40. The front face of the bearing member 44 terminates short of the front face of the disc 50.

Secured to the front face of the insulating disc 50 is the wiper arm 12 which forms a leg of a metal stamping generally indicated by the reference numeral 52. The end of the wiper arm 12 has an axial projecting portion 53 which is engageable with the potentiometer winding 14. The metal stamping 52 has a central inwardly extending leg 54 with a contact button 56 on the end thereof, for reasons to be explained. The other leg 58 of the stamping 52 has a rivet 62 on the end thereof which secures the stamping to the insulating disc 50. Another rivet 62' at the junction of the legs 12 and 54 of the stamping also secures the stamping to the insulating disc. Both the wiper arm 12 and the central leg 54 of the stamping project forwardly of the front face of the insulating disc as shown in Fig. 4 when the potentiometer winding is out of engagement therewith.

The assembly of the insulating disc 50, split sleeve collar 40, bearing member 44 and the control arm 11 is pivotally mounted for rotation about an axis which is coaxial of the axis of rotation of the pointer 6. To this end the metal bearing member 44 is provided with a cylindrical central bore 64 which receives a stationary pivot 66 secured to a vertical arm 68 extending upwardly from a horizontal securing strip 70. The latter strip is secured by screws 72 to the scale plate 4 of the Bourdon gauge. The wiper carrying assembly thus pivots on the pin 66. With this arrangement, the bearings of the sensitive pointer shaft 74 of the Bourdon gauge do not carry the weight of the wiper so that the wiper assembly offers a minimum drag or retarding force on the gauge movement thereby minimizing its effect on the sensitivity of the gauge.

The pivotally mounted insulating disc 13 carrying the potentiometer winding is provided with a rear cylindrical portion 77 of reduced diameter about which the helical windings 14 of the potentiometer are bent into a toroidal shape. The windings may be secured in place on the insulating disc 13 by gluing or by any other suitable means.

A pair of contact terminals 79 are anchored in suitable openings formed in the disc 13 and connect at one end to the opposite ends of the potentiometer windings 14 and at the other end with the leads 15 and 18. Contact with the wiper arm 12 of the potentiometer assembly is effected by means of a metal cylindrical contact member 81 anchored within a central hole formed in the insulating disc 13. The rear end of the contact member 81 is provided with a flat end 83 which projects beyond the rear face of the insulating disc 13 and is adapted to make contact with the button 56 formed on the central leg 54 of the metal stamping 52 carried on the other insulating disc 50. The conductor 16 is soldered to the front of the contact member 81.

The insulating disc 13 is carried at the end of the lever 29, previously mentioned, and this lever is in the form of an angle member having an upstanding leg 85 which is formed with a pair of spaced arms 87 which receive mounting screws 89' threaded into the insulating disc 13.

The bottom end of the leg 85 merges with a rearwardly extending leg 88 whose end is curved to form a bearing sleeve 89 which is pivotally mounted about a pivot pin 91 extending between mounting lugs 93 extending from the mounting strip 70. The pivot pin is held in place by nuts 95 threaded over the end of the pivot pin.

The limits of pivotal movement of the potentiometer winding carrying disc 13 is determined by the placement of two sets of nuts 94—94 and 96—96, respectively, which are threaded about the shank 98 of a screw 99 which is threaded into the vertical bearing arm 68 and passes freely through a slot 100 formed in the vertical leg of the lever member 29. The rearwardmost nuts 94—94 limit the rearward movement of the lever leg 85 and the forwardmost nuts limit the forward movement of the lever. A flat ring or washer 102 is interposed between the forwardmost pair of nuts 96—96 and the lever leg 85 to provide a bearing surface for the nuts.

The insulating disc 13 is normally urged into its rearward position by means of a compression spring 103, one end of which is fixed to the vertical arm 68 and the other end of which is secured around one of the arms 87 of the vertical leg 85 of the lever 29. In this latter position, the potentiometer winding 14 is pressed tightly against the contact projection 53 of the wiper arm 12, and the button 56 of the metal stamping 12 then engages the flat end 83 of the member 81 carried by the insulating disc 13. Electrical connection between the conductor 16 and the wiper 12 is thus established through the central leg 54 of the stamping 52, button 56, and contact member 81. The wiper arm 12 and stamping leg 54 are forced rearwardly by the potentiometer winding 14 and contact end 83, but the button 56 of the stamping does not contact the metal bearing 44 due to the recessed front face of the latter.

The friction between the wiper projection 53 and the potentiometer winding is sufficient to hold or lock the connected pointer 6 of the Bourdon gauge into position. If desired, other additional engaging means carried by the discs 50 and 13 (not shown) may be utilized to implement the frictional forces between the potentiometer winding and wiper.

The potentiometer winding carrying disc 13 is pivoted forwardly about the pivot pin 91 by means of the linkage 28 previously referred to. This linkage includes a threaded rod 105 one end of which freely passes through an oversized hole 107 in the lever leg 88, and a pair of nuts 109—109 threaded over the end of the rod 105. The nuts are adapted to bear against a flat washer 111 interposed between the nuts 109—109 and the leg 88 of the lever 29.

The other end of the rod 105 passes freely through a slot 112 (Fig. 3) in an actuating arm 114 of a collar member 116 which is secured by a screw 120 to the flat face 121 of the shaft 26. The bottom end of the rod 105 receives a pair of nuts 118—118 threaded thereover and a flat washer 122. A compression spring 123 is interposed between the washer 122 and the nuts 118—118. When the shaft 26 is rotated in a counter-clockwise direction as viewed in Fig. 3, by the energization of the relay 24, the spring 123 is placed under compression by the arm 114 which bears down on the ring 122. The force of the spring against the nuts 118—118 forces the rod 105 downward which causes the upper set of nuts 109 to pull the lever 29 down. This pivots the potentiometer winding carrying disc 13 forwardly an amount determined by the nuts 96—96' as previously explained. In this position, the potentiometer winding 14 and contact member 81 are out of engagement, respectively, with the wiper arm projection 53 and the contact button 56 so that the pointer 6 of the measuring instrument is free to assume a new position. When the relay 4 is de-energized, the potentiometer winding is returned to its locking position shown in Fig. 3.

Obviously, if desired, the operation of the relay 24 may be modified so that the energization of the relay locks rather than unlocks the potentiometer pointers in position. Also, the pointers may be normally locked in position, as in the described embodiment, or they may be normally free and locked only during the recording interval.

Refer now to Fig. 8 which shows a schematic diagram of a portion of the scanning switches 32. Three eleven position scanning switches 32a, 32b and 32c are shown each having a wiper 126 which is adapted to sequentially engage the associated stationary contacts 128. The scanning switches may be conventional telephone type stepping switches which are actuated by relay operated pawl and ratchet mechanism (not shown). For each pulsing of the relay, the wiper arm steps one position. The wipers of the switches are ganged for simultaneous movement. The three conductors 15, 16 and 18 associated with each potentiometer are connected with the corresponding contact on each of the stepping switches. A direct current voltage source 130 is connected between the wipers 126 of the outermost stepping switches 32a and 32c, and a conductor 132 leading to the measuring and recording apparatus 34 shown in Fig. 1 is connected to the wiper 126 of the other stepping switch 32b. Thus, as the wipers are stepped to the corresponding contacts of the stepping switches, a voltage proportional to the value of the related variable is coupled to the measuring and recording apparatus 34.

Where the load of a large number of potentiometers on the voltage source 130 is not undesirable, then, obviously, the switches 32a and 32c can be omitted with only the wiper connected conductors 16 being switched.

The present invention has thus provided simple and reliable means for memorizing the values of a large number of variables occurring at the same instant of time, and the variables are indicated by the position of a pointer of a measuring instrument. It also provides a relatively simple and inexpensive transducer which converts the position of measuring instrument pointer to an electrical output in a manner which does not appreciably affect the sensitivity of the measuring instrument.

It should be understood that numerous modifications may be made of the preferred embodiment of the invention above described without deviating from the broader aspects of the invention.

I claim:

1. The combination comprising a measuring instrument having a movable condition responsive element whose position is a measure of the value of the variable to be measured thereby, a transducer having a movable control means and a variable means engageable by said control means for providing a variable output determined by the position of said control means relative to said variable means, bearing means rotatably supporting said control means externally of said condition responsive element wherein said condition responsive element does not support the weight of said control means, means carried by said control means for coupling the movement of said condition responsive element ot said control means, said variable means being mounted for movement into and out of engagement with said control means, said variable means locking said control means and hence said condition-responsive element against movement when in engagement with said control means and means for moving said variable means toward and away from said control means.

2. A recording system comprising a recorder responsive to electrical signals fed to an input thereof, a plurality of independently operating measuring means responsive to different variables and each including a device having a sensitive movable element positioned in accordance with the value of the associated variable and an electrical device responsive to the position of said movable element and providing an electrical signal which is a function of the position of said movable element, respective locking means mounted for movement into locking relation with said sensitive movable elements where they are held in position, and out of locking relation therewith where the sensitive movable elements may proceed without restraint to new positions, scanning switch means for repeatedly sequentially connecting the outputs of said electrical devices to the input of said recorder which sequentially records the values of the variables in accordance with the electrical signals fed thereto, and means for simultaneously moving said locking means into said locking relation with the sensitive movable elements at the beginning of a recording interval and holding the same in said relation until the related variables have been recorded, and for subsequently moving the same out of locking relation therewith, whereby the sequentially recorded data represents data for the same time.

References Cited in the file of this patent

UNITED STATES PATENTS

| | | |
|---|---|---|
| 504,335 | Egan et al. | Sept. 5, 1893 |
| 1,699,759 | Shepherd | Jan. 22, 1929 |
| 2,132,213 | Locke | Oct. 4, 1938 |
| 2,302,769 | Haselton | Nov. 24, 1942 |
| 2,318,591 | Couffignal | May 11, 1943 |
| 2,402,182 | Rosen | June 18, 1946 |
| 2,467,948 | Sturm et al. | Apr. 19, 1949 |
| 2,577,820 | Singleton | Dec. 11, 1951 |
| 2,733,008 | D'Andrea | Jan. 31, 1956 |
| 2,766,445 | Bland | Oct. 9, 1956 |